United States Patent
Schwab et al.

(10) Patent No.: US 6,778,895 B1
(45) Date of Patent: Aug. 17, 2004

(54) CONTROL OF AN AUTOMATIC OR AUTOMATED GEARBOX USING VOICE COMMAND

(75) Inventors: Manfred Schwab, Ravensburg (DE); Ludger Ronge, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/088,882

(22) PCT Filed: Sep. 14, 2000

(86) PCT No.: PCT/EP00/08964

§ 371 (c)(1),
(2), (4) Date: Mar. 21, 2002

(87) PCT Pub. No.: WO01/23781

PCT Pub. Date: Apr. 5, 2001

(30) Foreign Application Priority Data

Sep. 29, 1999 (DE) .......................... 199 46 559

(51) Int. Cl.$^7$ .............................................. F16H 59/02
(52) U.S. Cl. ............................. 701/51; 701/53; 701/55; 701/1
(58) Field of Search ............................. 701/51, 53, 55, 701/1

(56) References Cited

U.S. PATENT DOCUMENTS

| 4,776,016 A | * | 10/1988 | Hansen ....................... 704/275 |
| 4,827,520 A | * | 5/1989 | Zeinstra ......................... 701/1 |
| 4,862,363 A | * | 8/1989 | Krisher et al. ................. 701/59 |
| 5,031,100 A | * | 7/1991 | Takahashi ..................... 701/55 |
| 5,214,707 A | * | 5/1993 | Fujimoto et al. ........... 704/275 |
| 5,396,420 A | * | 3/1995 | Graf ............................. 701/55 |
| 5,519,610 A | * | 5/1996 | Tsutsui et al. ................ 701/51 |
| 6,098,005 A | | 8/2000 | Tsukamoto et al. ........... 701/65 |
| 6,240,347 B1 | * | 5/2001 | Everhart et al. .............. 701/36 |

FOREIGN PATENT DOCUMENTS

| DE | 196 50 770 A1 | 6/1997 | .......... F16H/61/02 |
| DE | 197 38 747 A1 | 3/1998 | .......... F16H/59/50 |
| EP | 513424 A1 | * 11/1992 | .......... F16H/59/08 |
| FR | 2 699 978 | 7/1994 | .......... F16H/59/12 |
| JP | 02134451 A | * 5/1990 | .......... F16H/61/00 |

* cited by examiner

Primary Examiner—Thomas G. Black
Assistant Examiner—Eric M. Gibson
(74) Attorney, Agent, or Firm—Davis & Bujold PLLC

(57) ABSTRACT

In a system for shifting an automatic or automated variable transmission (2) of a vehicle with a voice command device (20) by the driver in which the voice commands given by the driver are compared with reference voice commands stored in a memory (22) and therefrom control signals are formed, in a transmission control (6) the control signals formed form the driver's voice commands are superimposed onto the shift signals calculated by the transmission control (6) in order therefrom to form a shift command of the variable transmission (2) of the vehicle appropriate for the driving situation.

11 Claims, 1 Drawing Sheet

CONTROL OF AN AUTOMATIC OR AUTOMATED GEARBOX USING VOICE COMMAND

FIELD OF THE INVENTION

The invention relates to the control of an automatic or automated gear shift in a variable transmission of a vehicle.

BACKGROUND OF THE INVENTION

Automatic or automated transmission of vehicles usually engage in accordance with preset shift programs which allow different parameters of the existing state of the vehicle and driver's requests to enter into the calculation of a suitable reduction ratio of the transmission. The sensors that produce the different parameters cannot detect imminent driving situations and influences upon the vehicle originating from the traffic situation and thus also cannot be the basis of a calculation. In different situations the active engagement of the driver is required since he can better appraise the vehicle situation, the traffic situation, the road state, or the peculiarities of the topography.

Situations can thus occur in which the transmission does shift but that are unsuitable and disagreeable for the driver. In those cases the transmission can shift at a moment unforeseeable for the driver or also an unforeseeably higher gear change not suited to the existing traffic situation or topography can be carried out.

DE 196 50 770 A1 has disclosed by way of example for automatic transmissions to control and thus to adjust the control lever for different shifting modes of the transmission via a voice control. Here the normally manual introduction of a shifting mode in an automatic transmission is replaced by the voice command, that is, the introduced shifting mode of an automatic transmission, not the change of a reduction ratio within the transmission, is corrected by voice control. Which reduction ratio is shifted to the respective shifting mode remains as before left to the control of the automatic transmission. Such an adjustment of the desired shifting mode also takes place only in few situations of the vehicle operation since, the same as is usual in an automatic transmission, the different shifting modes as a rule are introduced when the vehicle is stopped (forward, reverse, parking, etc.) and then during the driving operation in the respective shifting mode it is no more changed. The selection of the correct reduction ratio in the existing shifting mode remains then left to the transmission control. To the driver is only left which shifting mode to choose via the voice command. A change of the shifted reduction ratio is here hardly possible and a change based on the driving situation is absolutely impossible.

The problem on which the invention is based is, in an automatic or automated transmission, to assist in the transmission a change of the reduction ratio based on the driving situation.

SUMMARY OF THE INVENTION

In a system for shifting an automatic or automated variable transmission of a vehicle with device for voice command by the driver in which the voice commands given by the driver are compared with reference voice commands stored in a memory and therefrom control signals are formed, in a transmission control of the vehicle the control signals formed from the driver's voice commands are superimposed onto the shifting signals calculated by the transmission control in order to form therefrom a shift command for the vehicle transmission that is suited to a situation. Thereby the driver can control the vehicle correctly on the basis of vehicle, traffic situation or also topography. In an advantageous development the number of ratio steps when changing the reduction ratio, both when upshifting and when downshifting, are to be given via the device for voice command and in another development special driving programs like economy or sports programs or winter programs are to be given. In one development the creeping of the vehicle is to be suppressed by the device for voice command. In an advantageous development the command to maintain the actually engaged reduction ratio is given by the device for voice command or in one development a desired starting ratio corresponding to the actual load or gradient on which the vehicle stands is to be given. Another development shows for the device for voice command an apparatus of easy access for the driver with which the use of the device for voice command is released. In one development the use of a predeterminable time interval is released and in one development the apparatus is designed exclusively accessible for the driver himself during the travel.

An imminent traffic situation like a traffic light signal installation blocking a thoroughfare, the end of a bottleneck, a level crossing or a pedestrian crossing are detected by the driver with his sense organs. The same applied to the detection of an imminent gradient after a long drive on lat road or reaching of the bottom of the valley after long uphill drive possibly using additional braking devices of the vehicle. The given road state, specially as consequence of weather influences, hardly plays an important part for the reduction ratio to be engaged. The imminent situation can likewise require a shift over several gear steps or conversely not allow it or make it seem unsuitable. The driver can decide whether a gear shift still is or is not adequate. Accordingly, he will allow it, correct ir or prevent it by entering voice commands.

The shift reduction steps can be relevant to safety depending on the vehicle situation. Gear sifts based on wrong interpretation of the voice detection system, for ex., due to conversations of the passengers or other environmental noises like street noises or radio noises mus therefore be reliably eliminated. It must be possible to prevent that passenger emits an inappropriate voice command which becomes a dangerous engagement in the vehicle control. Hence, a control element must be provided that only the driver can reach and that releases only at times the input of voice commands to the transmission control. This can be an inching switch which when actuated releases the command input for the transmission functions for a predetermined or programmed time interval.

BRIEF DESCRIPTION OF THE DRAWING

The invention will now be described, by way of example, with reference to the accompanying drawings in which.

DETAILED DESCRIPTION OF THE INVENTION

Figure 1:
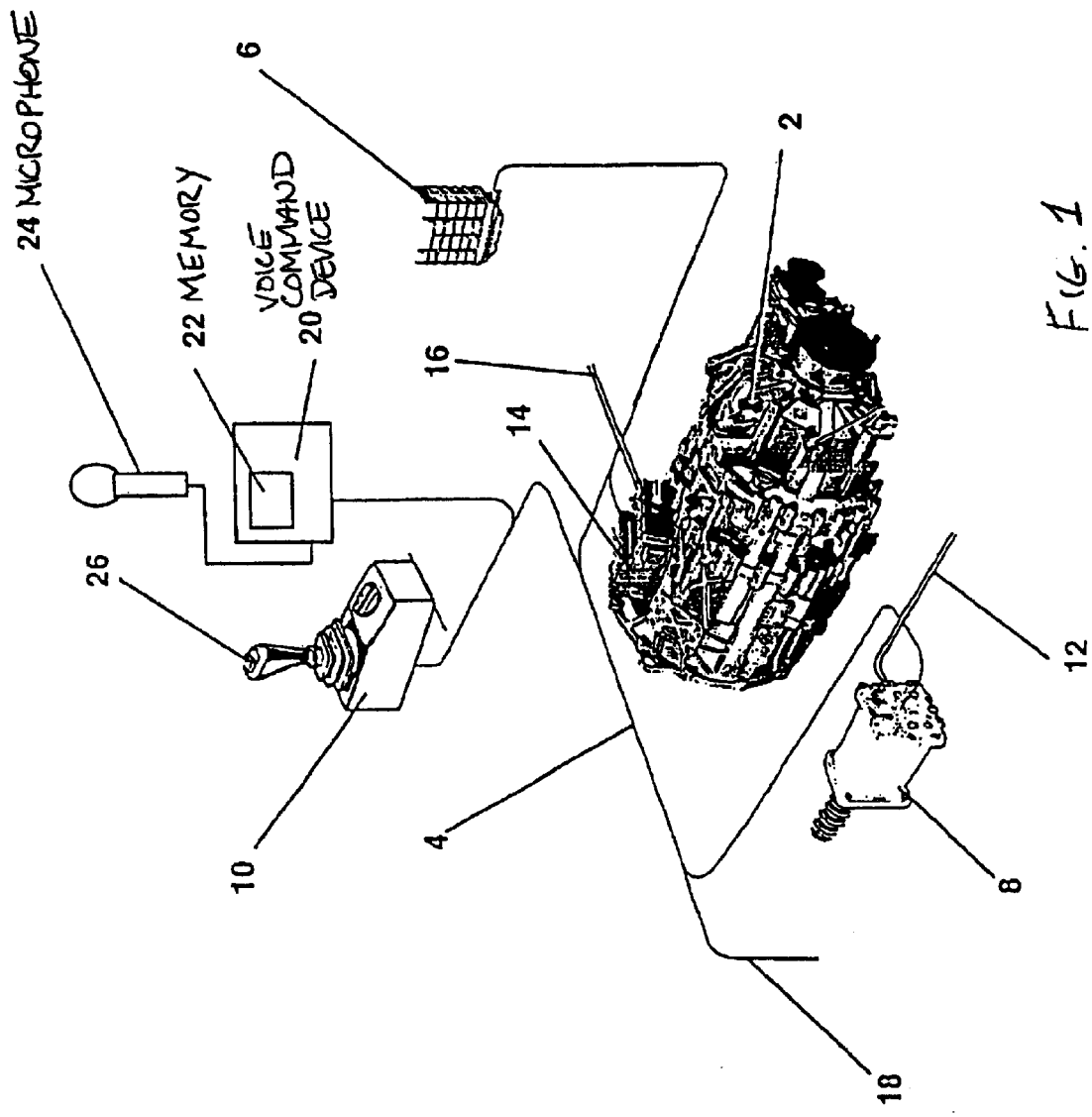
FIG. 1 shows the control of an automatic or automated gear shift in a variable transmission of a vehicle.

The single FIGURE shows an automated transmission 2 which is connected via a control line 4 such as a CAN bus line or other communication bus line with a transmission control 6, a clutch regulator 8 and a gear shift lever 10. Via the line 16 compressed air is supplied to a transmission regulator 14 and via the line 12 compressed air is supplied to the clutch regulator 8. The control line 4 is connected on an interface 18 with other elements of the vehicle not shown here like, for ex., motor electronics (EDC), motor brake, ABS, ASR or retarders. A device for voice command 20 is likewise attached to the control line 4. In the device 20 a memory 22 is located for voicecommands reference. A microphone 24 for input of voice commands by the driver is connected with the device 20. On the gear shift lever 10 a button 26 is provided with which the driver can release the voice commands. Such button can also be provided as steering drop arm on a steering wheel not shown here. The button can also be situated directly on the surface of the steering wheel or in the engagement area on the steering wheel rim.

What is claimed is:

1. A method of shifting a vehicle transmission by a driver's voice, the method comprising the steps of:

issuing a voice command (20) to a voice command input device;

converting the voice command to an electronic command signal and outputting the electronic command signal to a voice command convertor device (20) having a memory (22);

comparing the electronic command signal from the driver with a plurality of reference voice commands electronically stored in the memory (22) to determine a desired one of the reference voice commands;

forming a transmission control signal based on the determined desired one of the voice commands;

calculating a shift signal in the transmission control (6); and directly overriding a shift signal generated by the transmission control (6) with the electronic command signal generated by the driver's voice command to obtain a new shift signal and executing the transmission shift solely according to the new shift signal which is appropriate for the driving situation.

2. The method of shifting a vehicle transmission by a driver's voice according to claim 1, the method further comprising the steps of providing the number of gear steps during a change of a reduction ratio both in the upshifts and also in the downshifts via a driver's command issued to the voice command device (20).

3. The method of shifting a vehicle transmission by a driver's voice according to claim 1, the method further comprising the steps of providing special driving programs, such as economy, sports programs and winter programs via a driver's command issued to the voice command device (20).

4. The method of shifting a vehicle transmission by a driver's voice according to claim 1, the method further comprising the step of suppressing the creeping of the vehicle via a driver's command issued to the voice command device (20).

5. The method of shifting a vehicle transmission by a driver's voice according to claim 1, further comprising the step of maintaining an engaged reduction ratio via a driver's command issued to the voice command device (20).

6. The method of shifting a vehicle transmission by a driver's voice according to claim 1, further comprising the step of issuing a desired starting reduction ratio via a driver's command issued to the voice command device (20).

7. The method of shifting a vehicle transmission by a driver's voice according to claim 1, further comprising the step of providing an easily accessible device for overriding the operation of the voice command device (20).

8. The method of shifting a vehicle transmission by a driver's voice according to claim 7, further comprising the step of overriding the operation of the voice command device (20) for a predetermined time interval.

9. The method of shifting a vehicle transmission by a driver's voice according to claim 7, further comprising the step of making the overriding of the voice command device accessible exclusively to the driver.

10. A method for shifting a transmission (2) of a vehicle having a voice command device (2) operable by the driver via voice commands, the method comprising the steps of:

issuing a driver's voice command (20) to a voice command input device;

comparing the driver's voice command with reference voice commands stored in a memory (22), and forming a control signal in a transmission control (6) from the reference voice commands stored in the memory (22);

before executing a transmission shift, always modifying shifting signals calculated by said transmission control (6) according to the control signals formed from the driver's voice commands to form therefrom a shift command for said variable transmission (2) of the vehicle appropriate to the situation.

11. A method of overriding shifting of a vehicle transmission by a driver's voice, the method comprising the steps of:

generating shift signals in a transmission control (6);

executing shifting of the transmission according to the shift signal generated in the transmission control (6);

when the driver desires to control shifting of the transmission, the driver issuing a voice command (20) to a voice command input device;

converting the voice command to an electronic command signal and outputting the electronic command signal to a voice command convertor device (20) having a memory (22);

comparing the electronic command signal from the driver with a plurality of reference voice commands electronically stored in the memory (22) to select a desired one of the reference voice commands;

forming a transmission control signal based on the selected one of the reference voice commands in the memory (22);

calculating a shift signal in the transmission control (6) based upon the selected one of the reference voice commands;

always overriding the shift signal generated in the transmission control (6) by the electronic command signal generated by the driver's voice command, regardless of the shift signal generated in the transmission control (6), to obtain a new shift signal; and shifting the transmission based solely upon the new shift signal generated from the driver's voice command.

\* \* \* \* \*